(12) United States Patent
Balmond et al.

(10) Patent No.: US 12,140,528 B2
(45) Date of Patent: Nov. 12, 2024

(54) CORROSION SENSOR

(71) Applicant: BAE Systems plc, London (GB)

(72) Inventors: Mark David Balmond, Filton (GB);
Ian Michael Sturland, Filton (GB);
David William Gough; Christopher Colin Figgures, Filton (GB)

(73) Assignee: BAE Systems plc, London (GB)

( * ) Notice: Subject to any disclaimer, the term of this patent is extended or adjusted under 35 U.S.C. 154(b) by 195 days.

(21) Appl. No.: 18/013,136

(22) PCT Filed: Jun. 28, 2021

(86) PCT No.: PCT/GB2021/051632
§ 371 (c)(1),
(2) Date: Dec. 27, 2022

(87) PCT Pub. No.: WO2022/003330
PCT Pub. Date: Jan. 6, 2022

(65) Prior Publication Data
US 2023/0243737 A1    Aug. 3, 2023

(30) Foreign Application Priority Data

Jun. 29, 2020 (GB) .................................... 2009855

(51) Int. Cl.
*G01N 17/04* (2006.01)
*G01N 27/04* (2006.01)
*G01N 17/00* (2006.01)

(52) U.S. Cl.
CPC ............ *G01N 17/04* (2013.01); *G01N 27/04* (2013.01); *G01N 17/006* (2013.01)

(58) Field of Classification Search
CPC ....... G01N 17/04; G01N 27/04; G01N 17/006
See application file for complete search history.

(56) References Cited

U.S. PATENT DOCUMENTS 4,863,572 A * 9/1989 Jasinski ................ G01N 17/02
205/777
9,291,543 B1 * 3/2016 Robinson ............. G01N 17/006
(Continued)

FOREIGN PATENT DOCUMENTS

EP      2124035 A1    11/2009
WO  2008125878 A1    10/2008
(Continued)

OTHER PUBLICATIONS

Search Report for Patent Appl. No. GB2009855.4 mail date Dec. 30, 2020, 4 pages.
(Continued)

*Primary Examiner* — Reena Aurora
(74) *Attorney, Agent, or Firm* — Maine Cernota & Curran

(57) ABSTRACT

A corrosion sensor is described. The corrosion sensor comprises a substrate 10 and a patterned conductive layer provided on the substrate 10, wherein the conductive layer defines: a common terminal; a set of terminals, including a first terminal and a second terminal; and a set of sensing elements, including a first sensing element and a second sensing element; wherein respective sensing elements of the set thereof are electrically coupled to the common terminal and to respective terminals of the set thereof, such that the respective terminals of the set thereof are specific to the respective sensing elements of the set thereof.

13 Claims, 5 Drawing Sheets

(56) References Cited

U.S. PATENT DOCUMENTS

| | | | |
|---|---|---|---|
| 9,752,977 B2 * | 9/2017 | Balmond | ............... G01N 17/04 |
| 2007/0120572 A1 | 5/2007 | Chen | |
| 2011/0187395 A1 | 8/2011 | Morgan | |
| 2018/0259442 A1 | 9/2018 | Minamitani | |

FOREIGN PATENT DOCUMENTS

| | | |
|---|---|---|
| WO | 2009141639 A1 | 11/2009 |
| WO | 2014009696 A1 | 1/2014 |
| WO | 2016075427 A1 | 5/2016 |

OTHER PUBLICATIONS

International Search Report and Written Opinion for PCT Appl. No. PCT/GB2021/051632 mail date Sep. 2, 2021, 10 pages.
Combined Search and Examination Report for Patent Appl. No. GB2109277.0 mail date Dec. 15, 2021, 6 pages.

* cited by examiner

CORROSION SENSOR

RELATED APPLICATIONS

This application is a national phase application filed under 35 USC § 371 of PCT Application No. PCT/GB2021/051632 with an International filing date of Jun. 28, 2021, which claims priority of GB Patent Application 2009855.4 filed Jun. 29, 2020. Each of these applications is herein incorporated by reference in its entirety for all purposes.

FIELD

The present invention relates to corrosion sensors, for monitoring corrosion of a metal when mounted in situ thereon.

BACKGROUND TO THE INVENTION

Corrosion is a problem which leads to high maintenance and repair overheads in many different industries. Prompt detection of problems caused by corrosion is necessary in order for effective mitigation strategies to be put in place and so various different methods of detecting corrosion of metals have been developed.

Corrosion of metals used in aircraft structures is an extensive and expensive problem for the aerospace industry, demanding an estimated annual cost in excess of $2 billion, including an estimated $1.7 billion for corrosion maintenance. Despite this large cost on corrosion maintenance, corrosion remains a common cause of damage to metal components and accounts for about 25% of all metal component failures on aircraft—only fatigue is responsible for more failures.

Known corrosion sensors typically comprise patterned conductive thin films provided on substrates and are used as resistive sensors.

For example, a known corrosion sensor comprises a patterned conductive thin film provided on a substrate, in which the thin film is of a material, typically a metal, having corrosion characteristics representative of that of a metal of a structure on which the corrosion sensor is mounted. The corrosion sensor defines a set of sensing elements, for example linear or serpentine sensing elements, extending between common terminals, wherein the respective sensing elements are thus in parallel. A coating, for example paint optionally including a corrosion inhibitor, is provided over the substrate and the sensing elements. Defects (also known as perforations) may be deliberately included in the coating, for example by masking, thereby revealing, at least in part, the sensing elements to the corrosive media.

The initial overall resistance of the corrosion sensor (i.e. before the action of corrosive media) is determined, at least in part, by the resistivity of the conductive thin film and the respective lengths and cross-sectional areas of the sensing elements. The resistivity is predetermined by the selection of material for the conductive thin film, which is selected according to the metal of the structure on which the corrosion sensor is mounted. The respective lengths of the sensing elements are limited by the need for a compact corrosion sensor. The respective cross-sectional areas of the sensing elements are determined by the respective thicknesses and widths. Typically, the thickness is greater than 150 nm, such that corrosion of the sensing elements is representative of the metal of the structure. The width is limited by a requirement for the defects, typically having a minimum width of 0.2 mm, to reveal only parts of the sensing elements, rather than substrate.

Generally, the action of corrosive media on the sensing elements increases the overall resistance thereof, as measured between the common terminals. The measured increase in overall resistance may be related to the effects of corrosion of the metal of the structure on which the corrosion sensor is mounted. If a corrosion inhibitor is included in the paint, the overall resistance can often remain relatively constant until a reservoir of the corrosion inhibitor in the paint is exhausted proximal a particular defect, for example, whereupon the overall resistance will increase. Typically, sensing elements revealed, at least in part, by relatively larger defects begin to corrode earlier.

However, sensitivities of known corrosion sensors, for example to early onset corrosion and/or to local corrosion effects, are relatively low, such that corrosion of the metals of the structures on which these known corrosion sensors are mounted may not be detected responsively.

Hence, there is a need to improve corrosion sensors.

SUMMARY OF THE INVENTION

It is one aim of the present invention, amongst others, to provide a corrosion sensor which at least partially obviates or mitigates at least some of the disadvantages of the prior art, whether identified herein or elsewhere. For instance, it is an aim of embodiments of the invention to provide a corrosion sensor having an improved sensitivity, compared with known corrosion sensors. For instance, it is an aim of embodiments of the invention to provide a method of monitoring corrosion that enables identification of early onset corrosion and/or local corrosion effects.

A first aspect provides a corrosion sensor comprising:
a substrate; and
a patterned conductive layer provided on the substrate, wherein the conductive layer defines:
a common terminal;
a set of terminals, including a first terminal and a second terminal; and
a set of sensing elements, including a first sensing element and a second sensing element;
wherein respective sensing elements of the set thereof are electrically coupled to the common terminal and to respective terminals of the set thereof, such that the respective terminals of the set thereof are specific to the respective sensing elements of the set thereof.

A second aspect provides a corrosion sensing system comprising a set of corrosion sensors, including a first corrosion sensor and a second corrosion sensor, according to the first aspect.

A third aspect provides a structure comprising a corrosion sensor according to the first aspect or a corrosion sensing system according to the second aspect.

A fourth aspect provides a method of monitoring corrosion using a corrosion sensor according to the first aspect, the method comprising: measuring, for example continuously, periodically, intermittently, successively and/or cyclically, respective resistances between the common terminal and respective terminals of the set thereof.

DETAILED DESCRIPTION OF THE INVENTION

According to the present invention there is provided a corrosion sensor, as set forth in the appended claims. Also provided are a corrosion sensing system, a structure and a method. Other features of the invention will be apparent from the dependent claims, and the description that follows.

Corrosion Sensor

The first aspect provides a corrosion sensor comprising:
a substrate; and
a patterned conductive layer provided on the substrate, wherein the conductive layer defines:
a common terminal;
a set of terminals, including a first terminal and a second terminal; and
a set of sensing elements, including a first sensing element and a second sensing element;
wherein respective sensing elements of the set thereof are electrically coupled to the common terminal and to respective terminals of the set thereof.

Since the respective sensing elements of the set thereof are electrically coupled to the common terminal and to respective terminals of the set thereof, the respective resistances of the sensing elements of the set thereof may be individually measured, rather than only measuring the overall resistance as for known corrosion sensors. In this way, the sensitivity of the corrosion sensor is improved since the individual resistances of the sensing elements may be monitored. In this way, the corrosion sensor allows identification of early onset corrosion and/or local corrosion effects, such that corrosion of the metal of the structure on which the corrosion sensor is mounted may be detected more responsively. By detecting corrosion more responsively, remediation may be performed earlier, thereby reducing a cost and/or complexity associated with the corrosion.

Particularly, the inventors have observed that when measuring the overall resistance of known sensors, the overall resistance is dominated by corrosion of particular sensing elements, typically a single particular sensing element, since the sensing elements are in parallel. Thus, the corrosion of the other sensing elements may not be distinguished or only with relatively low sensitivity. That is, early onset corrosion and/or local corrosion effects of the other sensing elements typically may not be measured when the overall resistance is dominated by corrosion of the particular sensing elements, such that corrosion of the metal of the structure on which the corrosion sensor is mounted may not be responsively detected. For example, the resistance change due to local corrosion effects, such as exfoliation, intergranular corrosion, pitting, crevice corrosion and/or stress corrosion, may not be proportional to an extent of corrosion such that local corrosion effects may not be reliably detected by measuring the overall resistance.

In contrast, by individually measuring the respective resistances of the sensing elements of the set thereof, the corrosion of each sensing element may be monitored, thereby allowing detection of early onset corrosion and/or local corrosion effects, such as exfoliation, intergranular corrosion, pitting, crevice corrosion and/or stress corrosion. In other words, the problem with known corrosion sensors, in which the overall resistance is measured, is that information is lost because it is not always apparent which sensing element (or combination of sensing elements) are giving rise to measured changes in the overall resistance. This is particularly beneficial to know which sensing element is giving rise to measure changes when the sensing elements have different widths and/or lengths and hence are useful for indicating corrosion at different stages. This is especially beneficial when either perforations of different widths and/or lengths in a coating are being monitored or when an uncoated corrosion sensor comprising a set of sensing elements have been different respective weaknesses is used.

The corrosion sensor is especially suited to use as an inhibitor depletion sensor, as described below in more detail. Particularly, complex inhibitors may contribute to multiple inhibition mechanisms that act at different times. By measuring the overall resistance using known sensors, such multiple inhibition mechanisms acting at different times may not be observable. In contrast, by individually measuring the respective resistances of the sensing elements of the set thereof, such multiple inhibition mechanisms acting at different times may be observed.

Substrate

The corrosion sensor comprises the substrate.

It should be understood that the substrate comprises an insulating material suitable for providing the patterned conductive layer thereon. In one example, the insulating material comprises and/or is a polymeric composition comprising a polymer (i.e. a polymeric substrate). Typical suitable polymeric substrates include Mylar® and polyimide. Other suitable polymeric substrates are known. In one example, the insulating material comprises and/or is an insulating oxide, for example silicon dioxide. In one example, the insulating material is provided on a conductive layer.

Patterned Conductive Layer

The corrosion sensor comprises the patterned conductive layer provided on the substrate. Patterning of conductive layers on substrates for corrosion sensors is known.

In one example, the conductive layer is provided on the substrate by deposition, for example physical vapour deposition such as sputter deposition (including ion beam sputtering, reactive sputtering, ion assisted deposition, high-target-utilization sputtering, high-power impulse magnetron sputtering and gas flow sputtering, cathodic arc deposition, electron-beam physical vapour deposition, evaporative deposition, close-space sublimation and/or pulsed laser deposition. Other suitable methods of deposition, for example chemical vapour deposition, ion plating, thin-film deposition and ion beam-assisted deposition, are known. Such methods of deposition are particularly suitable for relatively thinner conductive layers. Relatively thicker conductive layers may be provided on the substrate by electroplating, dipping and/or bonding of foils, for example adhesively, to the substrate.

In one example, the conductive layer is annealed after deposition. In this way, grain growth in the conductive layer is promoted, such that the conductive layer has corrosion characteristics relatively more representative of that of a metal of a structure on which the corrosion sensor is mounted. By increasing the grain size of the conductive layer, detection of early stages of localised corrosion is improved. Since localised corrosion initiates at specific sites such as grain boundaries and/or specific intermetallic phases, production of conductive layers having similar compositions as the grain boundaries and/or intermetallic phases of bulk metals enhances detection of such localised corrosion.

In one example, the conductive layer is not annealed after deposition. Particularly and without wishing to be bound by any theory, a sensitivity to corrosion of the sensing elements may be controlled, to an extent, by adjusting widths of gaps between the sensing elements and/or conductive regions.

That is, the widths of the gaps may be predetermined such that the sensitivity to corrosion of a non-annealed sensing element is increased to be similar or equal to that of an annealed sensing element. By omitting annealing, fabrication of the sensor is simplified.

In one example, the conductive layer is patterned, for example by photolithographic patterning, for example after deposition or after annealing.

In one example, the conductive layer comprises and/or is a metal for example an alloy. Typically, the metal has corrosion characteristics representative of that of (i.e. mimics) a metal of a structure on which the corrosion sensor is mounted. In one example, a composition of the metal of the conductive layer is similar to the composition of the metal of the structure, typically including substitutional alloying additions within about 3 wt. %, preferably within 1 wt. % of that of the metal of the structure. Substitutional alloying additions included in the metal of the structure at relatively low concentrations, for example at most 3 wt. %, may be present in an amount of at most 1 wt. % or omitted from the metal of the conductive layer. Interstitial alloy additions may be included mutatis mutandis.

In one example, the metal of the structure comprises and/or is an aluminium alloy, for example a 1000 series, a 2000 series, a 3000 series, a 4000 series, a 5000 series, a 6000 series, a 7000 series, a 8000 series aluminium alloy, preferably a 1000 series, a 2000 series, a 6000 series, a 7000 series or an 8000 series aluminium alloy, preferably a 2000 series, a 4000 series, a 5000 series, a 6000 series, a 7000 series or an 8000 series aluminium alloy, having any applicable temper designation (i.e. -F, -H, -H1, -H2, -H3, -HX2, -HX4, -HX6, -HX8, -HX9, -0, -T, -T1, -T2, -T3, -T4, -T5, -T51, -T510, -T511, -T52, -T6, -T7, -T8, -T9, -T10, -W). In one example, the metal of the conductive layer corresponds with, for example is similar to, the aluminium alloy.

In one example, the aluminium alloy is an aerospace aluminium alloy selected from: 1420, 2004, 2014, 2017, 2020, 2024, 2080, 2090, 2091, 2095, 2124, 2219, 2224, 2324, 2519, 2524, 4047, 6013, 6061, 6063, 6113, 6951, 7010, 7049, 7050, 7055, 7068, 7075, 7079, 7093, 7150, 7178, 7475 and 8009.

In one example, the aluminium alloy is a marine aluminium alloy selected from: 5052, 5059, 5083, 5086, 6061 and 6063.

In one example, the metal of the conductive layer comprises Cu in a range from 2 wt. % to 8 wt. %, for example 5 wt. %, and balance Al and unavoidable impurities, suitable for wherein the metal of the structure comprises and/or is a 2000 series aluminium alloy such as an Al—Cu or Al—Si—Cu alloy for example 2004, 2014, 2017, 2020, 2024, 2080, 2090, 2091, 2095, 2124, 2219, 2224, 2324, 2519, 2524. In one example, the metal of the conductive layer comprises one or more other alloying conditions in amounts corresponding with 2000 series aluminium alloy.

In one example, the metal of the conductive layer comprises Si in a range from 5 wt. % to 20 wt. %, for example 12 wt. %, and balance Al and unavoidable impurities, suitable for wherein the metal of the structure comprises and/or is a 4000 series aluminium alloy such as an Al—Si alloy for example 4047. In one example, the metal of the conductive layer comprises one or more other alloying conditions in amounts corresponding with 4000 series aluminium alloy.

In one example, the metal of the conductive layer comprises Mg in a range from 2 wt. % to 8 wt. %, for example 5 wt. %, and balance Al and unavoidable impurities, suitable for a corrosion sensor wherein the metal of the structure comprises and/or is a 5000 series aluminium alloy such as an Al—Mg alloy for example 5052, 5059, 5083, 5086. In one example, the metal of the conductive layer comprises one or more other alloying conditions in amounts corresponding with 5000 series aluminium alloy.

In one example, the metal of the conductive layer comprises Mg in a range from 0.3 wt. % to 1.2 wt. %, for example 0.8 wt. %, Si in a range from 0.3 wt. % to 1.2 wt. %, for example 0.8 wt. %, and balance Al and unavoidable impurities, suitable for a corrosion sensor wherein the metal of the structure comprises and/or is a 6000 series aluminium alloy such as an Al—Mg—Si alloy for example 6013, 6061, 6063, 6113, 6951. In one example, the metal of the conductive layer comprises one or more other alloying conditions in amounts corresponding with the 6000 series aluminium alloy.

In one example, the metal of the conductive layer comprises Zn in a range from 2 wt. % to 8 wt. %, for example 5 wt. %, and balance Al and unavoidable impurities, suitable for a corrosion sensor wherein the metal of the structure comprises and/or is a 7000 series aluminium alloy such as an Al—Zn alloy for example 7010, 7049, 7050, 7055, 7068, 7075, 7079, 7093, 7150, 7178, 7475. In one example, the metal of the conductive layer comprises one or more other alloying conditions in amounts corresponding with the 7000 series aluminium alloy.

In one example, the metal of the conductive layer comprises Li in a range from 1 wt. % to 4 wt. %, for example 2 wt. %, and balance Al and unavoidable impurities, suitable for a corrosion sensor wherein the metal of the structure comprises and/or is an 8000 series aluminium alloy such as an Al—Li alloy for example 8009. In one example, the metal of the conductive layer comprises one or more other alloying conditions in amounts corresponding with the 8000 series aluminium alloy.

In one example, the metal of the conductive layer corresponds with, for example is similar to the metal of the structure, wherein the metal of the structure comprises and/or is a marine alloy, for example selected from a copper nickel alloy, for example a Cu—30Ni (wt. %) alloy; marine steel, for example DH36; aluminium bronze, for example Cu—6Al—2Ni (wt. %); and a stainless steel, for example Fe—18Cr—8Ni—low C (wt. %).

In one example, the metal of the conductive layer corresponds with, for example is similar to the metal of the structure, wherein the metal of the structure comprises and/or is a nickel alloy, for example Inconel 600® or Inconel 718®; pure titanium or a titanium alloy, such as Ti—6A—4V (wt. %); or an armour steel.

Common Terminal and Set of Terminals

The conductive layer defines the common terminal. It should be understood that the common terminal is common to the respective sensing elements of the set thereof i.e. electrically coupled thereto. In one example, the common terminal comprises and/or is a pad, for example a square or a rectangular pad, such as complying with a standard interface for example a cable connector. In this way, an external measurement device may be readily electrically coupled to the common terminal.

The conductive layer defines the set of terminals, including the first terminal and the second terminal. It should be understood that the set of terminals does not include the common terminal. It should be understood that the respective terminals of the set thereof are not common to the respective sensing elements of the set thereof c.f. the common terminal. It should be understood that the respective terminals of the set thereof are specific to the respective sensing elements of the set thereof i.e. only electrically coupled thereto. In one example, respective sensing elements of the set thereof are only electrically coupled to the common terminal and to respective terminals of the set thereof, for example wherein the first sensing element is only electrically coupled to the common terminal and to the first terminal and wherein the second sensing element is only electrically coupled to the common terminal and to the second terminal. In one example, respective terminals of the set thereof are specific to, for example specifically electrically coupled to or only electrically coupled to respective sensing elements of the set thereof. That is, the respective terminals of the set thereof are mutually electrically isolated and the respective sensing elements of the set thereof are mutually electrically isolated (i.e. mutually electrically insulated), other than via the common terminal. In this way, respective resistances of the respective sensing elements of the set thereof may be measured independently, between the common terminal and respective terminals of the set thereof. Respective terminals of the set thereof may be as described with respect to the common terminal mutatis mutandis. In one example, the set of terminals includes T terminals, including the first terminal and the second terminal, wherein T is a natural number greater than or equal to 2, for example 2, 3, 4, 5, 6, 7, 8, 9, 10 or more. In one example, the corrosion sensor comprises a conductive coupling element, arrangeable or arranged to conductively couple two or more terminals of the set thereof. In this way, the corrosion sensor may be connected to a legacy measuring device, for example.

In one example, the common terminal and the respective terminals of the set thereof are disposed on a same side of the corrosion sensor. In this way, an external measurement device may be readily electrically coupled to the common terminal and to the respective terminals of the set thereof while protection of the terminals, for example from the corrosive media, may be facilitated. Particular, corrosion of the exposed terminals is not desirable, which may be exacerbated by contacting with a dissimilar metal, for example of an electrical coupling.

In one example, the respective terminals of the set thereof are mutually aligned, equispaced and/or equisized, such as complying with a standard interface for example a cable connector. For example, the respective terminals of the set thereof may be arranged linearly. In this way, an external measurement device may be readily electrically coupled to the common terminal and to the respective terminals of the set thereof while protection of the terminals, for example from the corrosive media, may be facilitated, as described previously.

In one example, the common terminal and the respective terminals of the set thereof are mutually aligned, equispaced and/or equisized, such as complying with a standard interface for example a cable connector. For example, the common terminal and the respective terminals of the set thereof may be arranged linearly. In this way, an external measurement device may be readily electrically coupled to the common terminal and to the respective terminals of the set thereof while protection of the terminals, for example from the corrosive media, may be facilitated, as described previously.

Sensing Elements

The conductive layer defines the set of sensing elements, including the first sensing element and the second sensing element. As understood by the skilled person, the action of corrosive media on the respective sensing elements of the set thereof increases their respective resistances. It should be understood that the respective sensing elements of the set thereof are typically mutually spaced apart.

Respective sensing elements of the set thereof are electrically coupled to the common terminal and to respective terminals of the set thereof. In this way, the respective resistances of the sensing elements of the set thereof may be individually measured by measuring the respective resistances between the common terminal and respective terminals of the set thereof, thereby increasing the sensitivity of the corrosion sensor, as described previously.

It should be understood that the initial respective resistances of the sensing elements of the set thereof are determined, at least in part, by the respective lengths and cross-sectional areas thereof and the resistivity of the conductive layer.

Generally, it is preferable that the sensing element is relatively long while having a relatively small thickness, so as to increase the change in resistance due to thickness loss arising from corrosion. Conventionally, the initial respective resistances of the sensing elements are relatively high, for example greater than 1 k$\Omega$, such that effects of resistances of connecting cables, for example, on measurements are reduced. However, by measuring the individual resistances of the respective sensing elements of the set thereof and/or incorporating electronics on-board the sensor/within the sensor package, the effects of resistances of connecting cables, for example, may be reduced or eliminated, thereby permitting relatively lower initial respective resistances. Techniques for attenuating the effects of resistances of connecting cables, for example, are known. In one example, the initial resistance of the first sensing element is in a range from 0.1$\Omega$ to 100$\Omega$, preferably in a range from 0.5$\Omega$ to 50$\Omega$, more preferably in a range from 1$\Omega$ to 25$\Omega$, for example 5$\Omega$ or 10$\Omega$. The respective initial resistances of the sensing elements of the set thereof may be as described with respect to the first sensing element.

The resistivity is predetermined by the selection of material, for example a metal, for the conductive layer, which is selected according to the metal of the structure on which the corrosion sensor is mounted, as described previously.

Generally, by reducing the respective linear lengths of the sensing elements of the set thereof, a size of the corrosion sensor may be reduced. The net length of a sensing element may be increased for a given linear length by patterning a serpentine sensing element, for example. In this way, the resistance of the serpentine sensing element is increased for the given linear length. However, the minimum radius of curvature of the bends of the serpentine sensing element must be predetermined in order to avoid an enhancement of the rate of corrosion due to the curvature. In one example, the first sensing element comprises and/or is a serpentine sensing element. In one example, the first sensing element has a net length in a range from 1 L to 10 L, preferably in a range from 2 L to 8 L, more preferably in a range from 3 L to 5 L, wherein L is the linear length of the first sensing element.

In one example, the first sensing element comprises and/or is a linear sensing element, for example having a rectangular shape in plan view. In this way, patterning is simplified. Additionally and/or alternatively, forming a set of perforations, including a first perforation, in a coating, applied on the corrosion sensor, is facilitated since forming the first perforation so as to reveal only the first sensing element, or a part thereof, is simplified for a linear sensing element, compared with a serpentine sensing element, for example.

In one example, the first sensing element has a linear length in a range from 5 mm to 50 mm, preferably in a range from 7.5 mm to 40 mm, more preferably in a range from 10 mm to 30 mm, for example 15 mm, 20 mm or 25 mm. In this way, the corrosion sensor may be relatively compact.

The respective cross-sectional areas of the sensing elements are determined by the respective thicknesses and widths.

In one example, respective sensing elements of the set thereof have a thickness in a range from 50 nm to 150 nm, preferably in a range from 75 nm to 125 nm, for example 100 nm. By reducing the thickness, the respective resistances of the sensing elements of the set thereof may be increased. Particularly, the inventors have observed that the thickness of the respective sensing elements may be reduced, compared with conventional understanding, while achieving corrosion characteristics comparable with that of bulk material. In one example, respective sensing elements of the set thereof the same thickness, optionally having different widths. In this way, fabrication is relatively simpler. In one example, respective sensing elements have different thicknesses, optionally having the same width. In this way, the effects of corrosion over an extended period of time may be monitored since the effects of corrosion on the relatively thicker sensing elements will be relatively later and vice versa.

Additionally and/or alternatively, in one example, respective sensing elements of the set thereof have a thickness in a range from 0.25 mm to 2.0 mm, preferably in a range from 0.50 mm to 1.5 mm, more preferably in a range from 0.75 mm to 1.25 mm for example 1.0 mm. That is, the thickness may be relatively greater, for example for materials having relatively high rates of corrosion, such as mild steels, and/or low resistivities.

In one example, the first sensing element has a width in a range from 0.1 mm to 25 mm, preferably in a range from 0.2 mm to 10 mm, more preferably in a range from 0.5 mm to 5.0 mm, for example 0.6 mm, 0.8 mm, 1.0 mm, 2.0 mm, 3.0 mm or 4.0 mm. In this way, monitoring of corrosion may include different stages thereof. In one example, respective sensing elements of the set thereof have different widths, for example a series of increasing widths in the ranges described above. In this way, monitoring of corrosion is relatively more comprehensive, enabling the effects of corrosion to be monitored over an extended period of time.

In one example, the set of sensing elements includes S sensing elements, including the first sensing element and the second sensing element, wherein S is a natural number greater than or equal to 2, for example 2, 3, 4, 5, 6, 7, 8, 9, 10 or more. By increasing the number of sensing elements, understanding of the corrosion of the metal of the structure may be improved, for example enabling the corrosion sensor to provide a better indication of average effects of corrosion on metal of the structure, since, where only one sensing element is present, local effects unrepresentative of the behaviour of the metal of the structure in the presence of corrosive media may dominate the response of the corrosion sensor.

In one example, the set of sensing elements includes S sensing elements and the set of terminals includes T terminals, wherein S is equal to T. That is, each sensing element has a corresponding terminal.

In one example, respective sensing elements of the set thereof are mutually parallel and/or equispaced, for example arranged regularly.

In one example, respective sensing elements of the set thereof are arranged substantially radially, for example radiating from the common terminal (i.e. hub and spoke).

In one example, respective sensing elements of the set thereof are spaced apart by a distance in a range from 1 mm to 25 mm, preferably in a range from 2 mm to 10 mm, more preferably in a range from 3 mm to 8 mm, for example 3 mm, 4 mm, 5 mm, 6 mm, 7 mm or 8 mm. While it is desirable to reduce the distance between respective sensing elements so as to increase a number density thereof and provide a relatively more compact corrosion sensor, when a coating, including an inhibitor and having a set of perforations therein, is provided on the corrosion sensor, the respective perforations of the set thereof are preferably spaced apart sufficiently so that the coating between the respective perforations provides a sufficient reservoir of the inhibitor. Since the respective perforations of the set thereof preferably correspond with the respective sensing elements of the set thereof, the respective sensing elements are thus preferably correspondingly spaced apart.

Conductive Regions

In one example, the conductive layer defines:
a set of conductive regions, including a first conductive region;
wherein respective conductive regions of the set thereof are disposed between and electrically isolated from respective sensing elements of the set thereof.

In this way, the patterned conductive layer is generally provided over the substrate. In this way, the respective widths of the sensing elements may be relatively narrow while the remainder of the corrosion sensor surface, beneath an applied coating, remains at least approximately equal to that of the conductive layer alone because of the presence of the conductive regions. Particularly, most of the substrate may be covered by the patterned conductive layer, rather than the substrate being exposed. This provides a corrosion sensor having a relatively higher resistance whilst reducing risks of unrepresentative corrosion effects. In this way, the set of conductive regions enables the surface of the corrosion sensor beneath the applied coating to remain approximately equal to the surface beneath the applied coating of the structure on which the corrosion sensor is mounted, so that the corrosion sensor gives an accurate indication of the effects of corrosion on the metal of the structure. It should be understood that a shape of the first conductive region depends, at least in part, on a shape of the set of sensing elements. For example, if the sensing elements are linear, the conductive regions may be rectangular or square, for example. For example, if the sensing elements are serpentine, the conductive regions may be shaped accordingly. In one example, the patterned conductive layer, for example the conductive regions and the sensing elements, cover a proportion of the substrate in a range from 90% to 99.9%, preferably in a range from 92.5% to 99%, more preferably in a range from 95% to 97.5%.

In one example, respective conductive regions of the set thereof are electrically isolated from respective sensing elements of the set thereof by gaps, preferably having substantially uniform and/or equal widths. The conductive regions may be disposed closely adjacent either side of the first sensing element, such that the rate of corrosion of the first sensing element is increased. The width of the gap may be predetermined to obviate the need for the conductive layer to be annealed post-deposition, as described herein. Annealing has previously been necessary to ensure that corrosion of the tracks occurs as rapidly as expected for bulk material, but it has been found that the same effect can be achieved using the narrow gap. It is also possible to further narrow the gap to ensure that the sensor reacts rapidly to any potentially harmful corrosion. There may be first and second gaps defined between the first sensing element and the conductive regions, the gaps having a substantially uniform width. In one example, the gap is in a range from 1 μm to 100 μm, preferably in a range from 5 μm to 75 μm, more preferably in a range from 10 μm to 50 μm, most preferably in a range from 15 μm to 25 μm, for example 19 μm or 20 μm. Relatively narrower gaps may result in an increased rate of corrosion but if the gaps are too narrow, short circuits can occur between the sensing elements and the neighbouring conductive regions. Conversely, relatively wider gaps expose a relatively larger surface area of the substrate, having properties different from that of the conductive layer. It has been found empirically that if a conductive region is sufficiently close to a sensing element, the rate of corrosion of the sensing element is enhanced, by which it is meant that the rate of corrosion of the sensing element is accelerated relative to the rate of corrosion of a bulk sample of the material of the sensing element. The degree of enhancement is dependent on how close the conductive region is to the sensing element. The enhancement effect is amplified as the gap becomes smaller. It has been found that an enhancement effect is clearly visible when the gap is 2 μm. For gaps as great as 10 μm, an enhancement effect remains visible, but is significantly reduced, and a measurable effect may be expected when the gap is increased to 12 to 15 μm. Thus, by placing the separate conductive regions closely adjacent the sensing elements, the rate of corrosion of the sensing elements can be enhanced in a controllable way in dependence on the actual separation between the sensing elements and the conductive regions.

In one example, the first conductive region comprises a first set of conductive subregions, including a first conductive subregion and a second conductive subregion, wherein respective conductive subregions of the set thereof are mutually electrically isolated. That is, the first conductive region is divided into separate subregions. While this reduces, to a relatively small extent, a proportion of the substrate covered by the conductive region, the inventors have observed that annealing and/or thermal expansion during use of relatively large contiguous conductive regions may be problematic, resulting in electrical contact with adjacent sensing elements. Hence, by dividing the first conductive region into separate subregions, such problems may be avoided. In one example, a maximum dimension, for example a length or a width, of the first conductive subregion is in a range from 0.25 mm to 5.0 mm, preferably in a range from 0.50 mm to 2.5 mm, more preferably in a range from 0.75 mm to 1.25 mm, for example 981 μm or 1.0 mm. It should be understood that a shape of the first conductive subregion depends, at least in part, on a shape of the set of sensing elements. For example, if the sensing elements are linear, the conductive subregions may be rectangular or square, for example. For example, if the sensing elements are serpentine, the conductive subregions may be shaped accordingly. The second conductive subregion may be as described with respect to the first conductive subregion.

In one example, respective conductive subregions of the set thereof are mutually electrically isolated by spacings, preferably having substantially uniform and/or equal widths. The spacings may be generally as described with respect to the gaps between the conductive regions and the adjacent sensing elements.

In one example, respective conductive regions and/or respective subregions thereof are mutually electrically coupled, coupled or couplable to a ground and/or coupled or couplable to a power supply unit, for example at a predetermined potential. In this way, corrosion of the sensing elements may be representative of the metal of the structure.

Track

In one example, the conductive layer defines:
a common track; and
optionally a set of tracks, including a first track and a second track;
wherein respective sensing elements of the set thereof are electrically coupled to the common terminal via the common track; and
optionally wherein respective sensing elements of the set thereof are electrically coupled to respective terminals of the set thereof via respective tracks of the set thereof.

In this way, the set of sensing elements and the set of terminals may be laid out in the patterned conductive layer, electrically coupled as required by the respective tracks.

A thickness of the tracks may be relatively greater than that of the sensing elements, thereby reducing relative resistances thereof. In one example, the common track and/or respective tracks of the set thereof have a thickness in a range from 0.25 μm to 10 μm, preferably in a range from 0.5 μm to 5 μm, more preferably in a range from 0.75 μm to 2.5 μm, for example 1 μm or 2 μm.

In one example, the common track and/or respective tracks of the set thereof have a width in a range from 0.5 mm to 5 mm, preferably in a range from 0.75 mm to 3 mm, more preferably in a range from 1 mm to 2 mm.

In one example, the common track and/or respective tracks of the set thereof are electrically isolated from respective conductive regions of the set thereof and/or spaced apart from respective sensing elements of the set thereof by gaps and/or mutually spaced apart by gaps, preferably having substantially uniform and/or equal widths, generally as described with respect to the gaps between the sensing elements and the conductive regions.

In one example, the first track is bounded, at least in part, by the second track. That is, the second track surrounds, at least in part for example on two or three sides, the first track, thereby increasing a compactness of the corrosion sensor. In one example, the first sensing element, the first track and optionally the first terminal are bounded, at least in part, by the second sensing element, the second track and optionally the second terminal. In other words, the corrosion sensor, for example the set of sensing elements, is nested. By nesting the set of sensing elements, a greater number density of sensing elements may be included on the corrosion sensor while reducing the number density of tracks, compared with known corrosion sensors having a plurality of individual sensing elements thereupon, and the individual resistances of the respective sensing elements may be measured.

In one example, the common terminal, the common track, the respective sensing elements of the set thereof, the respective tracks of the set thereof and the respective terminals of the set thereof define a set of resistive circuits, including a first resistive circuit defined by the common terminal, the common track, the first sensing element, the first track and the first terminal and a second resistive circuit defined by the common terminal, the common track, the second sensing element, the second track and the second terminal, wherein the second resistive circuit bounds, at least in part, the first resistive circuit. In other words, the resistive circuits are nested, notwithstanding that the common terminal and the common track are common to the first resistive circuit and the second resistive circuit. In one example, the set of resistive circuits includes R resistive circuits, including the first resistive circuit and the second resistive circuit, wherein R is a natural number greater than or equal to 2, for example 2, 3, 4, 5, 6, 7, 8, 9, 10 or more, wherein the $r^{th}$ resistive circuit bounds, at least in part, for example surrounds, at least in part, on two or three sides, the $(r-1)^{th}$ resistive circuit, for r equals 2 to R. For example, when R is equal to 3, the third resistive circuit bounds, at least in part, the second resistive circuit which in turn bounds, at least in part, the first resistive circuit. That is, the resistive circuits are successively nested. In this way, the corrosion sensor may be relatively more compact while the terminals may be arranged for coupling to an external measurement device while being better protected, as described previously.

In one example, the respective tracks of the set thereof are stacked, for example including insulator layers therebetween. In this way, a compactness of the corrosion sensor may be improved.

Coating

In one example, the corrosion sensor comprises a coating, optionally having a set of perforations, including a first perforation, therein and/or therethrough. By providing the coating, corrosion of the metal of the structure on which the corrosion sensor is mounted may be mimicked by the corrosion sensor. In one example, the coating is the same coating as provided on the metal of the structure. It should be understood that the coating extends over (i.e. covers) the conductive layer, or a part of, and optionally exposed surfaces of the substrate. In one example, the coating does not extend over the common terminal or the set of terminals. In this way, an electrical circuit may be electrically coupled to the common terminal and the set of terminals. In one example, the coating extends over the complete conductive layer, except for the common terminal and the set of terminals, and exposed surfaces of the substrate.

It should be understood that the one purpose of the coating is to provide corrosion protection for the conductive layer. It should be understood that the coating is typically the same as that coating applied to the structure upon which the corrosion sensor is mounted. For example, the corrosion sensor may be mounted on the structure and the coating subsequently applied to the corrosion sensor and the structure. Suitable coatings for different conductive layers are known. A brief overview is provided of coatings for aluminium alloys.

Corrosion protection of aluminium alloys is typically a multistep treatment process including pre-treatment processes, such as anodising, followed by application of conversion coatings and/or organic coatings (barrier and inhibitor combinations), to give a multi-layered coating. For example, a typical multistep treatment process comprises:
1. selective deoxidation, for intermetallic (IM) particle removal and surface etching, to improve adherence of coatings to the surface and may provide some corrosion protection;
2. deposition or growth of a manufactured oxide via electrochemical (anodising) or chemical (conversion coating) means; and
3. use of an organic coating for specific applications, normally including, but not limited to, a primer and a top-coat.

Anodised coating processes for aluminium alloys typically produce an outer oxide having a cellular structure on top of a thin barrier layer that provides some protection against corrosion. Inhibitors may be included in the outer porous layer of the anodized layer during formation or as a seal after formation to offer some extra protection upon damage. Processes for electrochemical growth of surface protective oxides include chromic acid anodizing while more environmentally-friendly alternatives such as sulfuric, sulfuric-boric, sulphuric-tataric and phosphoric based processes may be preferred.

Conversion coatings are an alternative to anodizing, in which a coating is chemically precipitated on the surface. For high strength aluminium alloys, such as 2000 and 7000 series aluminium alloys, chromate conversion coating (CrCC or CCC) is the preferred process. Replacements for the toxic chromate-based conversion coatings include a range of treatments based on self-assembled monolayers, sol-gel chemistries, Ti/Zr oxyfluorides, rare earth, cobalt, vanadates, molybdates and permanganate processes.

After anodising or conversion coating, an organic coating is typically applied. Many organic coatings are known and described herein are organic coatings suitable for high strength aluminium alloys, such as 2000 and 7000 series aluminium alloys. The organic coating usually includes a primer, a topcoat and optionally, one or more intermediate coats. The primer layer is the main corrosion protective layer and includes corrosion inhibitors that are released when corrosive species or water reach the aluminium alloy. In order to provide corrosion protection to the aluminium alloy, the inhibitor should be provided during a corrosion event at a concentration higher than the minimum concentration at which the inhibitor stops corrosion (critical concentration). This is important because the critical concentration of the inhibitor in the primer must be maintained during the service life of structures such as airframes, where maintenance may not be practicable due to inaccessibility. Chromate inhibitors provide continuous protection and repair to the surface of the aluminium alloy while the chromate remains above the critical concentration. This mechanism of inhibitor release and metal protection may be termed a self-healing mechanism, since the release of the active species recovers the protective layer on top of the metal. Other inhibitors are known. The topcoat and optional intermediate coats provide physical barriers; the topcoat may provide an impervious layer.

In one example, the coating comprises an inhibitor, as described above, for example included in a first layer of the coating. That is, the first layer may be a primer, for example.

Example primers include PPG PR205 and PPG PR143. Other primers are known.

In one example, coating includes a zeroth layer, for example underlying the first layer, such as an anodising or conversion layer, for example a chromic acid anodising layer or an Alocrom or Alodine conversion coating.

In one example, the coating includes a second layer, for example overlaying the first layer such as an intermediate coat or a topcoat.

Example topcoats include PPG EC75 and PPG CA8311. Other topcoats are known.

In one example, the coating includes a zeroth layer, such as an anodising or conversion layer, for example a chromic acid anodising layer or an Alocrom conversion coating, the first layer, such as a primer, and a second layer, such as an intermediate coat or a topcoat.

Methods of applying the coating are known.

In one example, the first layer of the coating is applied directly on the conductive layer, for example without any interlayers therebetween.

In one example, the coating includes a zeroth layer, such as an anodising or conversion layer, for example a chromic acid anodising layer or an Alocrom conversion coating, and the zeroth layer is applied on the conductive layer, for example directly on the conductive layer, and first layer is applied on the zeroth layer, for example directly on the zeroth layer, wherein the zeroth layer underlays the first layer.

In one example, the coating includes a second layer, such as an intermediate coat or a topcoat, and the second layer is applied on the first layer, for example directly on the first layer, wherein the second layer overlays the first layer.

In one example, the coating includes a zeroth layer, such as an anodising or conversion layer, for example a chromic acid anodising layer or an Alocrom conversion coating, the first layer, such as a primer, and a second layer, such as an intermediate coat or a topcoat.

In one example, the coating is cured after application thereof.

In one example, the corrosion sensor comprises a coating, having a set of perforations, including a first perforation, therein and/or therethrough, wherein the coating extends substantially across the whole of the substrate and the conductive layer, wherein the coating comprises and/or is a paint comprising a corrosion inhibitor and wherein the first perforation coincides with (i.e. is at the location of) the first sensing element. In this way, the corrosion sensor may be used as an inhibitor depletion sensor. The corrosion sensor according to the first aspect is particularly suited to use as an inhibitor depletion sensor, since it is in this type of corrosion sensor that a problem of low resistance described above has proved particularly difficult to overcome.

Perforations

In one example, the coating has a set of perforations, including a first perforation, therein and/or therethrough. It should be understood that a perforation is a defect in the coating, for example a passageway or an aperture through, for example partly or fully through, a thickness of the coating. It should be understood that the set of perforations is generally similar, for example the first perforation and a second perforation are generally similar, such as with respect to shape but may have different dimensions transverse to their respective depths.

In one example, the set of perforations is machined in the coating, for example by scribing, milling, turning and/or cutting the coating, for example using a tool. Suitable tools are known.

In one example, the set of perforations is provided, at least in part, using a mask before applying the coating and removing the mask thereafter. That is, the set of perforations is defined by the mask.

In one example, the first perforation has a first depth through the coating and a first dimension transverse, for example orthogonal, to the first depth. It should be understood that the first dimension is a lateral dimension of the first perforation, for example a width or a diameter c.f. a length. In one example, the first dimension is in a range from 50% to 99%, preferably in a range from 75% to 97.5%, more preferably in a range from 85% to 95% of a width of the first sensing element. In one example, the first perforation has a second dimension transverse, for example orthogonal, to the first depth. It should be understood that the second dimension is a longitudinal dimension of the first perforation, for example a length. In one example, the second dimension is in a range from 10% to 90%, preferably in a range from 20% to 80%, more preferably in a range from 30% to 70% of a length of the first sensing element. In one example, the first perforation extends through the coating, for example fully through the coating, whereby the first depth corresponds with (i.e. is equal to) a thickness of the coating, thereby revealing (i.e. uncovering) the conductive layer and/or the substrate. In one example, the first perforation does not reveal the substrate. In one example, the first perforation reveals the first sensing element, or a part thereof, for example only a part of the first sensing element. In this way, the part of the first sensing element is revealed to the corrosive media via the first perforation. In one example, the first perforation is a channel, for example having a linear channel having a rectangular shape. In one example, a cross-sectional shape of the channel is a quadrilateral, preferably a regular quadrilateral, such as a square, a rectangle or an isosceles trapezium. If the cross-sectional shape of the channel is an isosceles trapezium, walls of the channel taper outwards away from the base. In one example, the channel has a cuboidal or a trapezoidal shape. In one example, the first perforation is a bore, for example having a circular shape. It should be understood that a diameter of the bore is measured at a base thereof. Circular perforations may avoid effects resulting from anisotropy of perforations having other shapes, for example square or rectangular. In one example, a cross-sectional shape of the bore is a quadrilateral, preferably a regular quadrilateral, such as a square, a rectangle or an isosceles trapezium. If the cross-sectional shape of the bore is an isosceles trapezium, walls of the bore taper outwards away from the base. In one example, the bore has a cylindrical or a frustoconical shape.

In one example, the set of perforations includes P perforations, wherein P is a natural number greater than or equal to 2, for example 2, 3, 4, 5, 6, 7, 8, 9, 10 or more. Each perforation of the set of perforations may be as described with respect to the first perforation, mutatis mutandis. In one example, respective perforations of the set thereof have similar sizes, for example the same size. In one example, respective perforations of the set thereof have different sizes, for example corresponding with respective sizes of the set of sensing elements.

In one example, the set of perforations includes respective perforations for the set of sensing elements, for example one perforation for each sensing element, preferably wherein respective perforations of the set thereof have sizes corresponding with respective sizes of the set of sensing elements, preferably wherein respective perforations reveal respective sensing elements, or a part thereof, for example only a part of the respective sensing elements (i.e. not revealing the substrate, an adjacent sensing element and/or an adjacent conductive region). In one example, the set of perforations does not reveal a conductive region, or part thereof. Particularly, since the conductive regions are not part of the sensing elements, corrosion of these conductive regions cannot be measured. However, if a part of a conductive region is revealed, migration of an inhibitor towards the revealed part of the conductive region from the coating when revealed to corrosive media, for example, depletes the inhibitor in the coating, reducing the availability of inhibitor for the sensing element. In this way, corrosion of the sensing element may not be representative of that of the metal of the structure. This may be exacerbated since the revealed part of the conductive region will be relatively more proximal the coating than the revealed sensing element.

Electronic Component

In one example, the corrosion sensor comprises an electronic component, for example a resistor or a set of resistors such as for a Wheatstone bridge, an amplifier, a multiplexer, a micro-processor, a data logger, an interface for a data bus and/or a wireless interface, electrically coupled to the common terminal and/or respective terminals of the set thereof. In this way, an electrical circuit, or part thereof, for measuring respective resistances between the common terminal and respective terminals of the set thereof and/or communicating with a measurement device may be provided on the corrosion sensor.

In one example, the patterned conductive layer comprises an electronic component, as described above. In this way, the electronic component may be integrated into the patterned conductive layer.

In one example, the corrosion sensor comprises, is comprised in and/or is an Internet of Things, IoT, device. In this way, the corrosion sensor may be included in an IoT network.

In one example, the corrosion sensor, for example the patterned conductive layer, comprises a thermocouple. Particularly, the resistivity of the conductive layer is a function of temperature and hence, by including a thermocouple in the corrosion sensor, the respective resistances of the sensing elements of the set there of may be compensated for changes in temperature.

Corrosion Sensing System

The second aspect provides a corrosion sensing system comprising a set of corrosion sensors, including a first corrosion sensor and a second corrosion sensor, according to the first aspect.

In one example, the corrosion sensing system comprises a measurement device electrically coupled to the common terminal and respective terminals of the set thereof, for example for measuring respective resistances between the common terminal and respective terminals of the set thereof.

Structure

The third aspect provides a structure, for example comprising a metal having a coating thereon, comprising a corrosion sensor according to the first aspect or a corrosion sensing system according to the second aspect.

In one example, the corrosion sensor is mounted on the structure adhesively, for example using a Mylar® foil, and/or in a joint between components of the structure. Other methods of mounting corrosion sensors are known.

In one example, a metal of the conductive layer is representative of the metal of the structure, for example as described with respect to the first aspect. In one example, a coating of the corrosion sensor is similar to, preferably the same as, the coating of the metal of the structure. In this way, by monitoring corrosion of the corrosion sensor, corrosion of the metal of the structure may be inferred Method The fourth aspect provides a method of monitoring corrosion using a corrosion sensor according to the first aspect, the method comprising: measuring, for example continuously, periodically, intermittently, successively and/or cyclically, respective resistances between the common terminal and respective terminals of the set thereof.

In one example, measuring respective resistances between the common terminal and respective terminals of the set thereof comprises measuring respective resistances between the common terminal and respective terminals of the set thereof using a Wheatstone bridge. In this way, the respective resistances between the common terminal and respective terminals of the set thereof may be accurately measured through sensing of a null in the bridge current once balance has been achieved. In one example, one or more of the bridge resistors are included on the substrate.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Like reference signs denote like features, description of which is not repeated for brevity.

Figure 1:
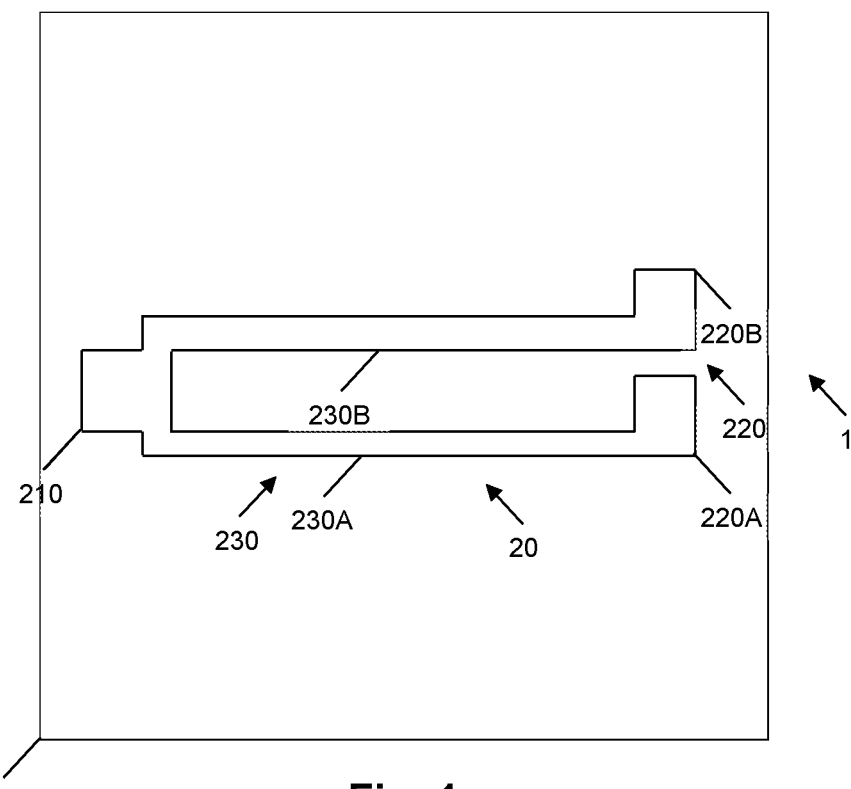
FIG. 1 schematically depicts a corrosion sensor according to an exemplary embodiment.

FIG. 1 schematically depicts a corrosion sensor 1 according to an exemplary embodiment. The corrosion sensor 1 comprises a substrate 10 and a patterned conductive layer 20 provided on the substrate 10, wherein the conductive layer 20 defines: a common terminal 210; a set of terminals 220, including a first terminal 220A and a second terminal 220B; and a set of sensing elements 230, including a first sensing element 230A and a second sensing element 230B; wherein respective sensing elements 230A, 230B of the set 230 thereof are electrically coupled to the common terminal 210 and to respective terminals 220A, 220B of the set 220 thereof.

In this example, the substrate 10 is a polymeric substrate, particularly Mylar. In this example, the substrate 10 is square, having dimensions 20 mm by 20 mm.

In this example, the conductive layer 20 is a metal, particularly an Al—5Cu (wt. %) aluminium alloy, whereby the corrosion sensor 1 is suitable monitoring corrosion of a 2000 series aluminium alloy structure. In this example, the conductive layer 20 is provided on the substrate 10 by sputter deposition, annealed after deposition and subsequently patterned by photolithographic patterning.

In this example, the common terminal 210 is a rectangular pad. In this example, the respective terminals 220A, 220B of the set 220 thereof are rectangular pads, mutually aligned and of the same size as the common terminal 210.

In this example, the first sensing element 230A is a linear sensing element having a rectangular shape in plan view. In this example, the first sensing element has a linear length of about 13 mm, a width of 0.6 mm and a thickness of 100 nm. In this example, the second sensing element 230B is generally as described with respect to the first sensing element 230A, having a width of 1.0 mm. in this example, the respective sensing elements 230A, 230B of the set 230 thereof are mutually parallel, spaced apart by a distance of about 3 mm.

In this example, the common terminal 210 is disposed proximal one side of the substrate 10, the set of terminals 220 is disposed proximal an opposed side of the substrate 10 and the set of sensing elements 230 extends therebetween. In this example, respective sensing elements 230A, 230B of the set thereof are arranged substantially radially, radiating from the common terminal 210.

Figure 2:
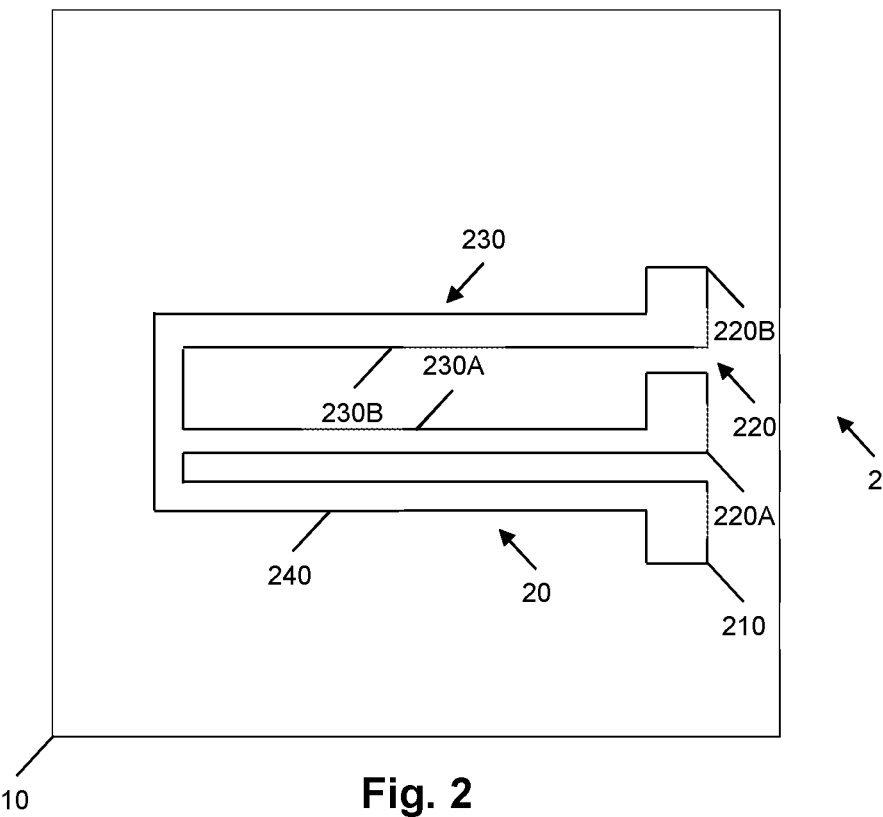
FIG. 2 schematically depicts a corrosion sensor according to an exemplary embodiment.

FIG. 2 schematically depicts a corrosion sensor 2 according to an exemplary embodiment. The corrosion sensor 2 is generally as described with respect to the corrosion sensor 1.

In this example, the conductive layer 20 defines a common track 240, wherein respective sensing elements 230A, 230B of the set 230 thereof are electrically coupled to the common terminal 210 via the common track 240. In this example, the common track 240 has a width of 1.0 mm and a thickness of 1 μm.

In this example, the common terminal 210 is disposed proximal one side of the substrate 10, and the set of terminals 220 is disposed proximal the same side of the substrate 10. In this example, the common terminal 210 and the respective terminals 220A, 220B of the set 220 thereof are mutually aligned, equispaced and equisized.

Figure 3:
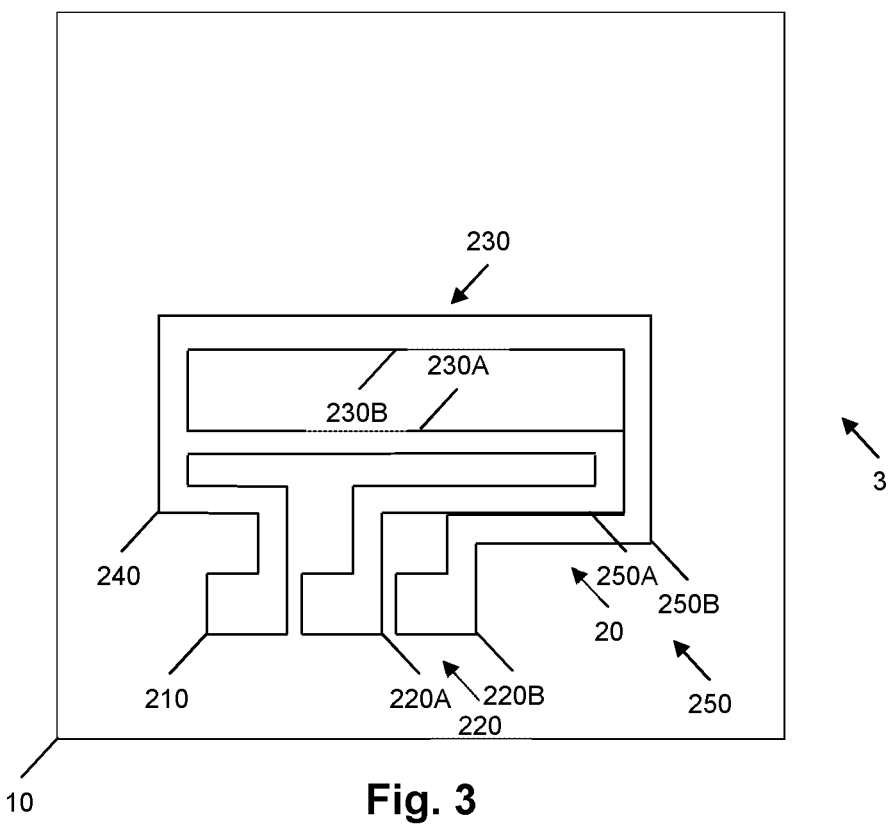
FIG. 3 schematically depicts a corrosion sensor according to an exemplary embodiment.

FIG. 3 schematically depicts a corrosion sensor 3 according to an exemplary embodiment. The corrosion sensor 3 is generally as described with respect to the corrosion sensor 2.

In this example, the conductive layer 20 defines a set of tracks 250, including a first track 250A and a second track 250B; wherein respective sensing elements 230A, 230B of the set 230 thereof are electrically coupled to respective terminals 220A, 220B of the set 220 thereof via respective tracks 250A, 250B of the set thereof. In this example, the respective tracks 250A, 250B of the set 250 thereof have a width of 1.0 mm and a thickness of 1 μm. In this example, the respective tracks 250A, 250B of the set 250 thereof are mutually spaced apart by uniform gaps having a width of 19 μm.

In this example, the first track 250A is bounded, at least in part, by the second track 250B. That is, the second track 250B surrounds, at least in part on two sides, the first track 250A. In this example, the first sensing element 230A, the first track 250A and the first terminal 220A are bounded, at least in part, by the second sensing element 230B, the second track 250B and the second terminal 220B. In other words, the corrosion sensor 3 is nested. In this example, a linear length of the second sensing element 230B is greater than a linear length of the first sensing element 230A, by about a width of the first track 250A.

In this example, the common terminal 210, the common track 240, the respective sensing elements 230A, 230B of the set 230 thereof, the respective tracks 250A, 250B of the set 250 thereof and the respective terminals 220A, 220B of the set 220 thereof define a set of resistive circuits, including a first resistive circuit defined by the common terminal 210, the common track 240, the first sensing element 230A, the first track 250A and the first terminal 220A and a second resistive circuit defined by the common terminal 210, the common track 240, the second sensing element 230B, the second track 250B and the second terminal 220B, wherein the second resistive circuit bounds, at least in part, the first resistive circuit. In other words, the resistive circuits are nested, notwithstanding that the common terminal 210 and the common track 240 are common to the first resistive circuit and the second resistive circuit. In this example, the set of resistive circuits includes R resistive circuits, including the first resistive circuit and the second resistive circuit, wherein R is 2, wherein the $r^{th}$ resistive circuit bounds, surrounds, at least in part, on three sides, the $(r-1)^{th}$ resistive circuit, for r equals 2 to R.

Figure 4:
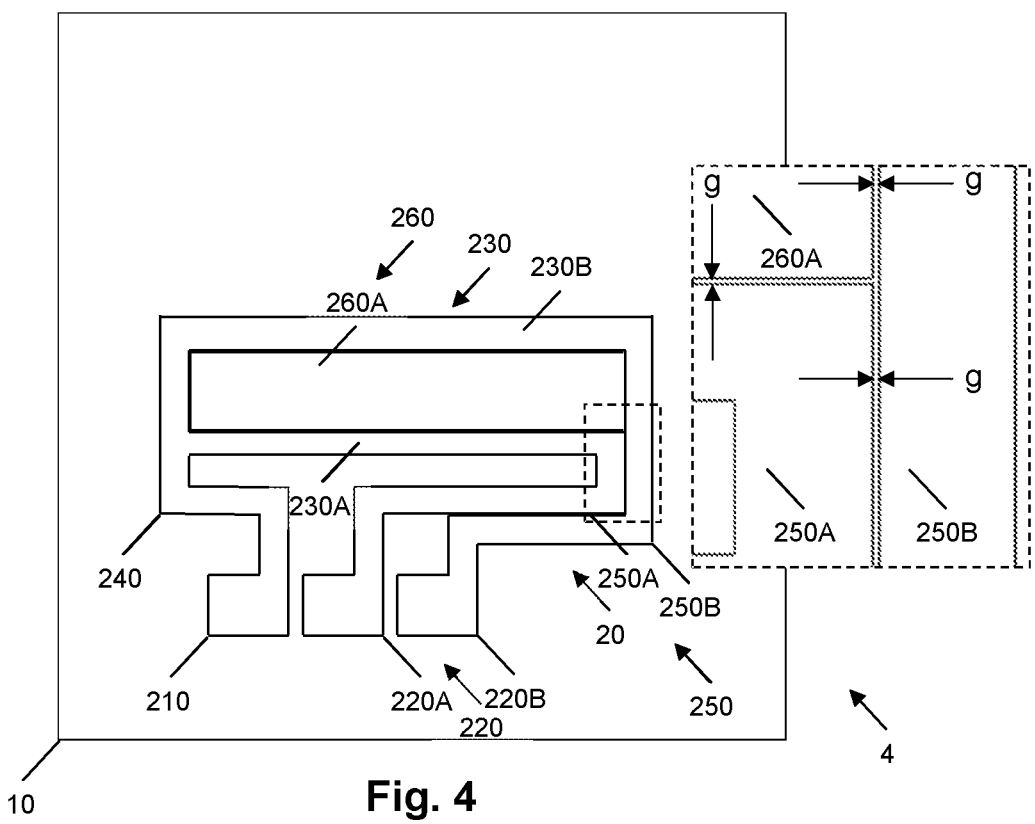
FIG. 4 schematically depicts a corrosion sensor according to an exemplary embodiment.

FIG. 4 schematically depicts a corrosion sensor 4 according to an exemplary embodiment. An enlarged view is shown inset. The corrosion sensor 4 is generally as described with respect to the corrosion sensor 3.

In this example, the conductive layer 20 defines a set of conductive regions 260, including a first conductive region 260A; wherein respective conductive regions 260A of the set 260 thereof are disposed between and electrically isolated from respective sensing elements 230A, 230B of the set 230 thereof. In this example, respective conductive regions 260A of the set 260 thereof are electrically isolated from respective sensing elements 230A, 230B of the set 230 thereof and the respective tracks 250A, 250 of the set 250 thereof by gaps g, having uniform and equal widths of 19 μm.

In this example, the first conductive region 260A is rectangular, disposed between the first sensing element 230A and the second conductive element 230B.

Figure 5:
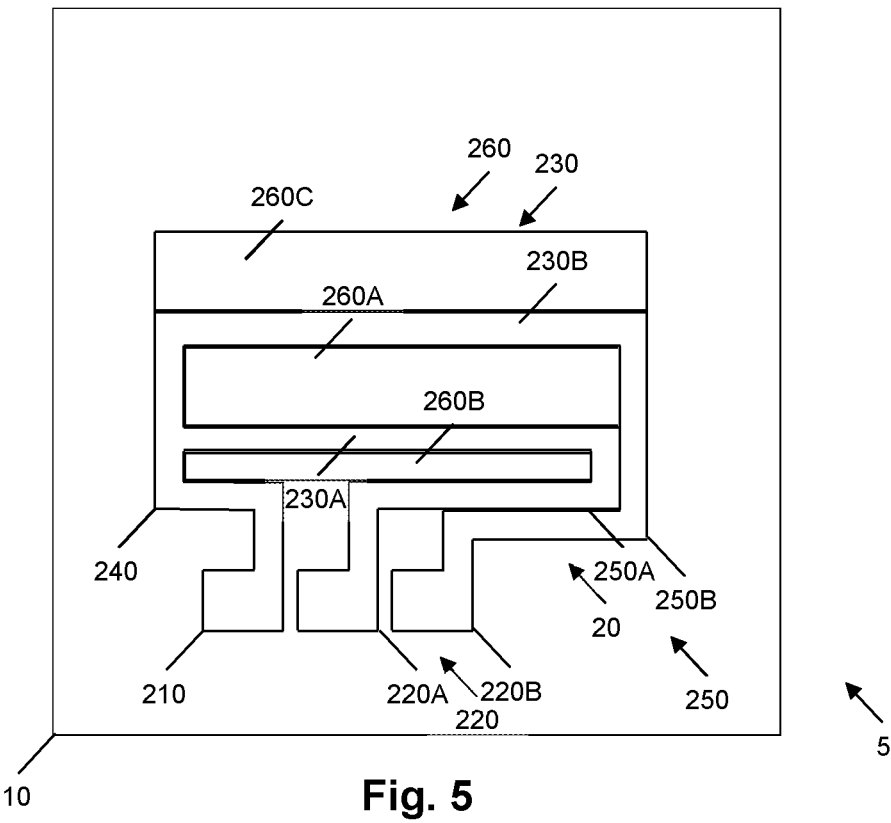
FIG. 5 schematically depicts a corrosion sensor according to an exemplary embodiment.

FIG. 5 schematically depicts a corrosion sensor 5 according to an exemplary embodiment. The corrosion sensor 5 is generally as described with respect to the corrosion sensor 4.

In this example, the conductive layer 20 defines the set of conductive regions 260, including the first conductive region 260A, a second conductive region 260B and a third conductive region 260C.

In this example, the second conductive region 260B is rectangular, disposed to one side of the first sensing element 230A and the third conductive region 260C is disposed to the other side of the second conductive element 230B.

Figure 6:
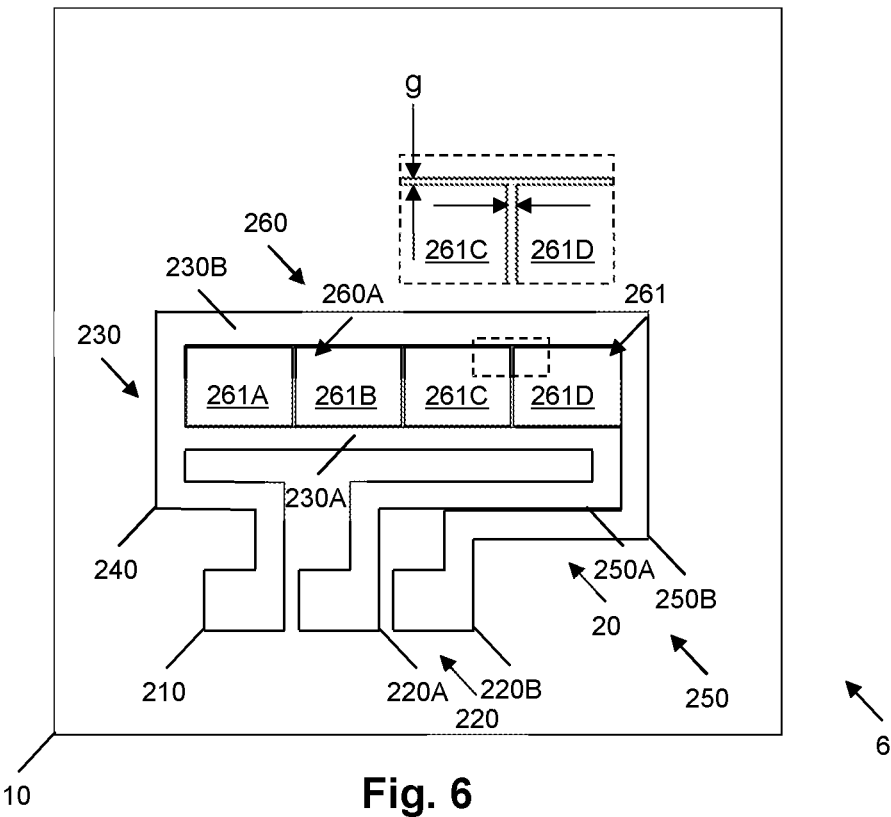
FIG. 6 schematically depicts a corrosion sensor according to an exemplary embodiment.

FIG. 6 schematically depicts a corrosion sensor 6 according to an exemplary embodiment. An enlarged view is shown inset. The corrosion sensor 6 is generally as described with respect to the corrosion sensor 4.

In this example, the first conductive region 260A comprises a first set 261 of conductive subregions, including a first conductive subregion 261A and a second conductive subregion 262B, wherein respective conductive subregions 261A, 261B of the set 261 thereof are mutually electrically isolated. In this example, the first set 261 of conductive subregions includes four conductive subregions 261A, 261B, 261C, 261D. In this example, respective conductive subregions 261A, 261B, 261C, 261D of the set 261 thereof are mutually electrically isolated by spacings, having substantially uniform and equal widths of 19 μm.

Figure 7:
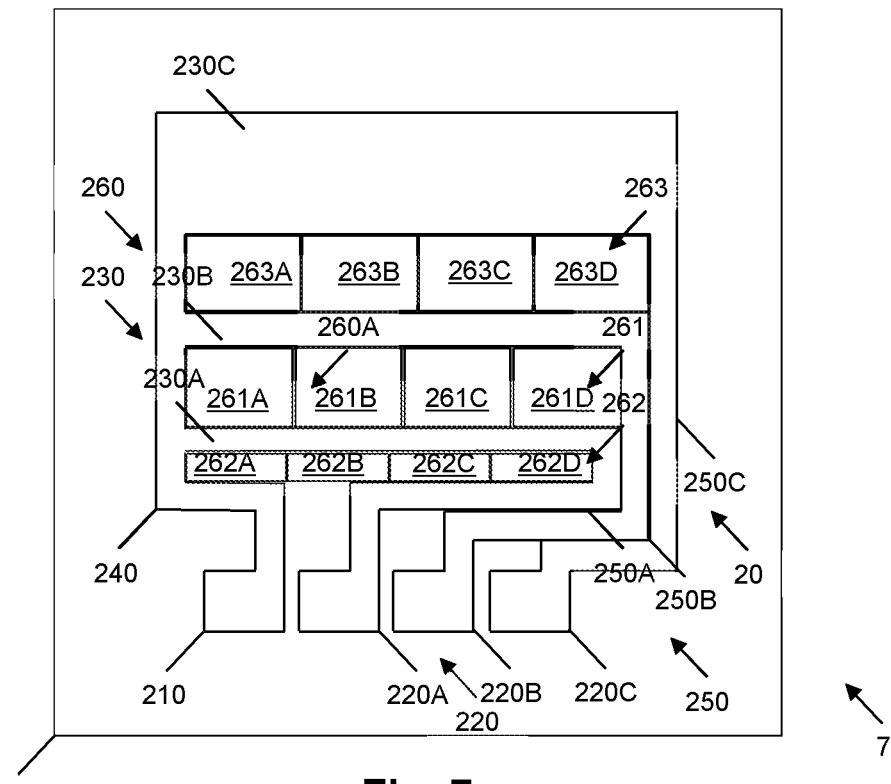
FIG. 7 schematically depicts a corrosion sensor according to an exemplary embodiment.

FIG. 7 schematically depicts a corrosion sensor 7 according to an exemplary embodiment. The corrosion sensor 7 is generally as described with respect to the corrosion sensor 4.

In this example, the set of terminals 220 includes a third terminal 220C, the set of sensing elements 230 includes a third sensing element 230C and the set of tracks 250 includes a third track 250C, generally as described with respect to the second terminal 220B, the second sensing element 230B and the second track 250B respectively, mutatis mutandis. In this example, the third sensing element 230C has a width of 4.0 mm.

The set of resistive circuits includes a third resistive circuit defined by the common terminal 210, the common track 240, the third sensing element 230C, the third track 250C and the third terminal 220C, wherein the third resistive circuit bounds, at least in part, the second resistive circuit, as described with respect to the second resistive circuit, mutatis mutandis.

In this example, the first conductive region 260A comprises a first set 261 of conductive subregions, including a first conductive subregion 261A and a second conductive subregion 262B, wherein respective conductive subregions 261A, 261B of the set 261 thereof are mutually electrically isolated, as described with respect to the corrosion sensor 6.

In this example, the second conductive region 260B comprises a second set 262 of conductive subregions 262A, 262B, 262C, 262D and the third conductive region 260C comprises a third set 263 of conductive subregions 263A, 263B, 263C, 263D, as described with respect to the first set 261 of conductive subregions, mutatis mutandis.

Figure 8:
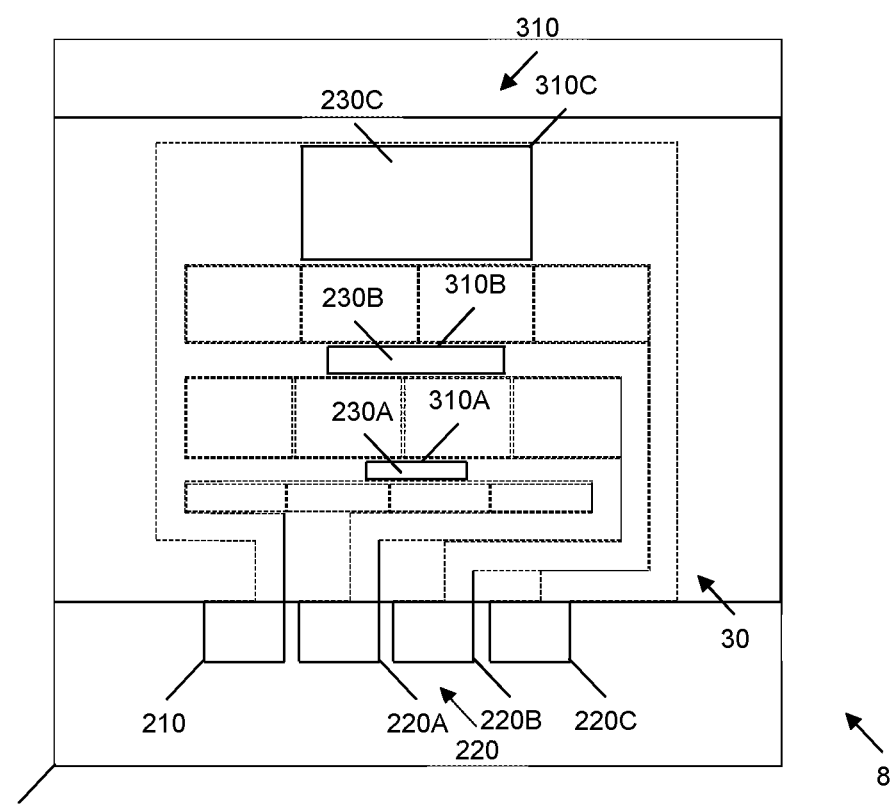
FIG. 8 schematically depicts a corrosion sensor according to an exemplary embodiment.

FIG. 8 schematically depicts a corrosion sensor 8 according to an exemplary embodiment. The corrosion sensor 8 is generally as described with respect to the corrosion sensor 7.

In this example, the corrosion sensor 8 comprises a coating 30, having a set of perforations 310, including a first perforation 310A, therein and therethrough. Particularly, the corrosion sensor 8 is the corrosion sensor 7 comprising the coating 30.

This example, the coating 30 includes a first layer, particularly a primer PPG PR143 comprising an inhibitor, and a second layer, particularly a topcoat PPG EC75.

In this example, the set of perforations 310 includes the first perforation 310A, a second perforation 310B and a third perforation 310C, provided by masking after applying the coating 30. In this example, respective perforations 310A, 310B, 310C of the set 310 thereof reveal only parts of respective sensing elements 230A, 230B, 230C. In this example, respective perforations 310A, 310B, 310C of the set 310 thereof have different sizes, corresponding with respective sizes of the set of sensing elements 230. In this example, respective perforations 310A, 310B, 310C of the set 310 thereof are rectangular, having a width of about 90% of the width of the respective sensing elements 230A, 230B, 230C and a length of about 40% of the length of the respective sensing elements 230A, 230B, 230C.

Figure 9:
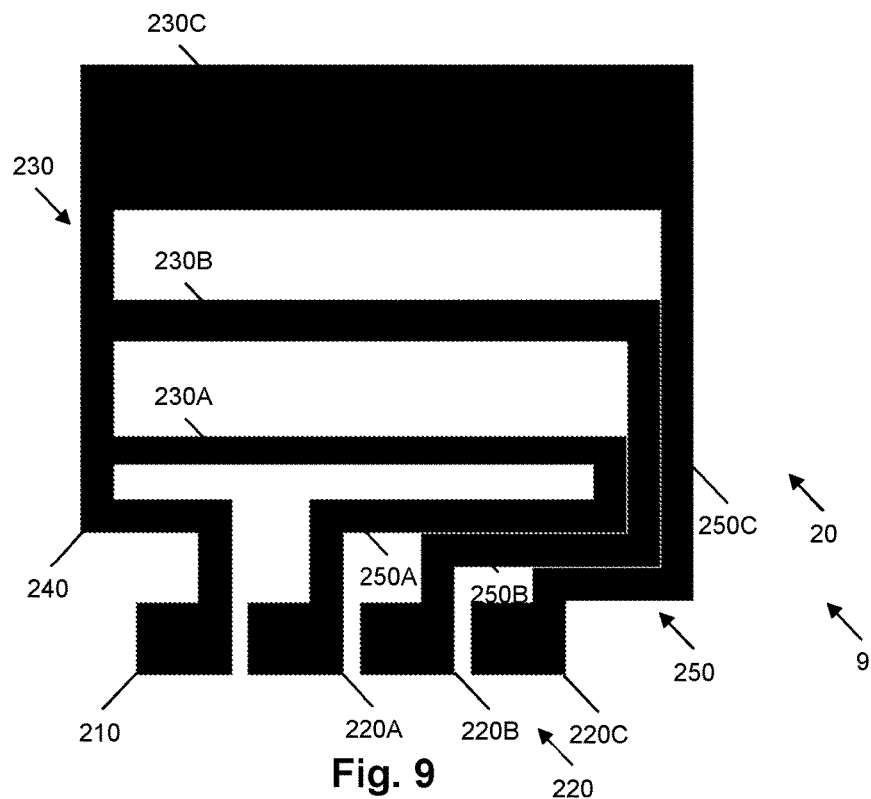
FIG. 9 schematically depicts a corrosion sensor according to an exemplary embodiment.

FIG. 9 schematically depicts a corrosion sensor 9 according to an exemplary embodiment. The corrosion sensor 9 is generally as described with respect to the corrosion sensor 8. The set of conductive regions 260 and the coating 30, having the set of perforations 310 therein and therethrough, are not shown for convenience. In this example, respective conductive regions 260A, 260B, 260C of the set thereof respectively comprise sets of conductive subregions 261, 262, 263, wherein the respective sets of conductive subregions include subregions having dimensions of 981 μm by 981 μm.

Figure 10:
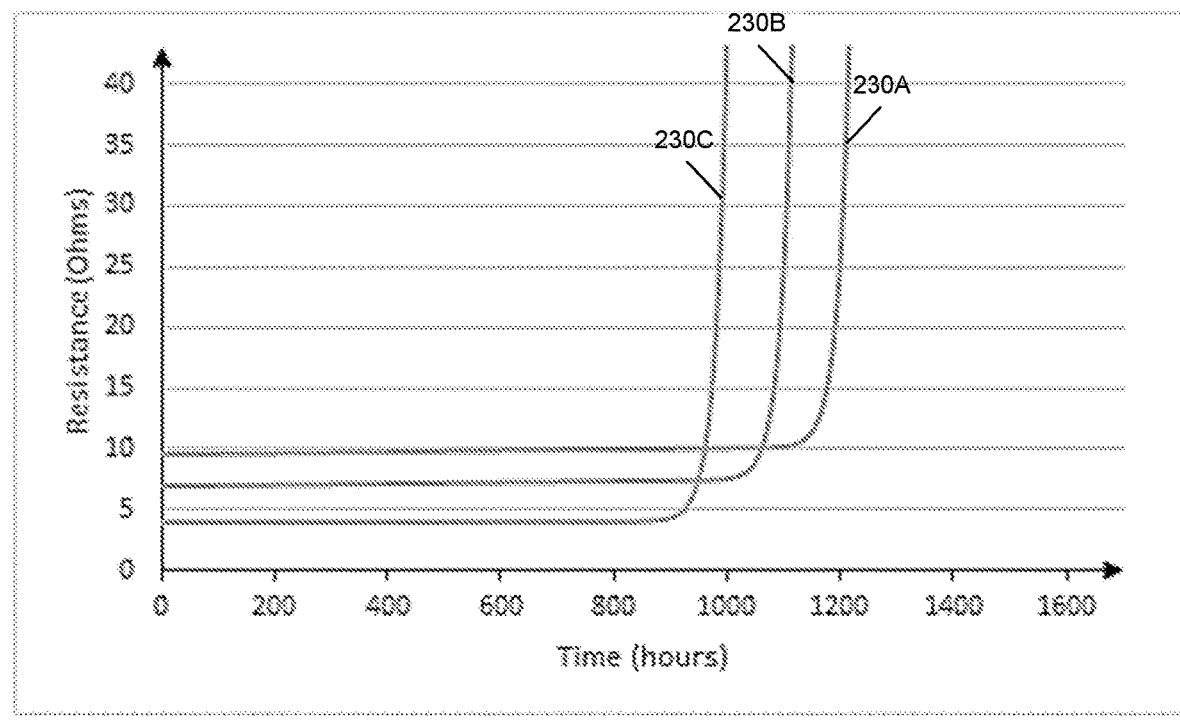
FIG. 10 is a graph of measured respective resistances as a function of time for a method of monitoring corrosion using the corrosion sensor according to FIG. 9.

FIG. 10 is a graph of measured respective resistances as a function of time for a method of monitoring corrosion using the corrosion sensor 9 according to FIG. 9.

When the corrosion sensor is mounted in situ, for example on a joint between two components on the internal frame of an aircraft or on an external surface of a seaplane, an intermittent current signal is passed in turn from the common terminal 210 to the respective terminals 220A, 220B, 220C of the set 220 thereof via the respective sensing elements 230A, 230B, 230C of the set 230 thereof and the respective voltage signals measured. The resistance of the respective sensing elements 230A, 230B, 230C of the set 230 thereof may be trivially calculated from the respective measured voltage signals. Typically, the calculated respective resistances will be approximately constant for a period of time before beginning to increase as the third sensing element 230C beneath the largest, third perforation 310C begins to corrode, once the reservoir of inhibitor in the coating 30 around this third perforation 310C is exhausted. The resistance of the third sensing element 230C will then continue to increase until this third sensing element 230C has corroded through, at which time the resistance of the third sensing element 230C tends to infinity (open circuit). Similarly, once the second sensing element 230B beneath the intermediate-sized perforation 310B begins to corrode, the resistance of the second sensing element 230B similarly begin to increase, until the second sensing element 230B has corroded through. Similarly, once the first sensing element 230A beneath the smallest perforation 310A begins to corrode, the resistance of the first sensing element 230A similarly begin to increase, until the first sensing element 230A has corroded through.

The third sensing element 230C has the lowest initial resistance of about 4 Ω, having the widest width of 4.0 mm. However, the third sensing element 230C is revealed by the largest perforation 310C and hence corrosion is observed relatively sooner, at about 900 hours. In more detail, the resistance of the third sensing element 230C is relatively constant until about 900 hours, when the resistance increases very rapidly due to depletion of the inhibitor in the coating 30.

The second sensing element 230B has initial resistance of about 7Ω, having width of 1.0 mm, and the second sensing element 230B is revealed by the intermediate perforation 310B and hence corrosion is observed relatively later at about 1000 hours. In more detail, the resistance of the second sensing element 230B is relatively constant until about 1000 hours, when the resistance increases very rapidly due to depletion of the inhibitor in the coating 30.

The first sensing element 230A has the highest initial resistance of about 9.5Ω, having the narrowest width of 0.6 mm. However, the first sensing element 230A is revealed by the smallest perforation 310A and hence corrosion is observed relatively later, at about 1100 hours. In more detail, the resistance of the first sensing element 230A is relatively constant until about 1100 hours, when the resistance increases very rapidly due to depletion of the inhibitor in the coating 30.

In contrast, the resultant profile of overall resistance with time of a known sensor will have, at best, a stepped appearance, with each step (if discernible) occurring at the time at which the respective sensing elements 230A, 230B, 230C corrode through. However, depending, at least in part, on the number of sensing elements in the set thereof and their respective initial resistances, the sizes of the respective perforations in the set thereof, the corrosion mechanisms and/or the inhibition mechanisms due to the inhibitors in the coating 30, these steps may not be discernible or most only when the respective sensing elements have corroded through, such that early onset and/or local corrosion effects may not be monitored.

Hence, the sensor according to the first aspect allows monitoring of corrosion at the earliest possible stage, which may not be monitored using a known sensor.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A corrosion sensor comprising:
a substrate; and
a patterned conductive layer provided on the substrate,
wherein the patterned conductive layer defines: a common terminal; a set of terminals, including a first terminal and a second terminal; a set of sensing elements, including a first sensing element and a second sensing element; and a set of conductive regions, including a first conductive region,
wherein respective sensing elements of the set thereof are electrically coupled to the common terminal and to respective terminals of the set thereof, such that the respective terminals of the set thereof are specific to the respective sensing elements of the set thereof,
wherein respective conductive regions of the set thereof are disposed between and electrically isolated from respective sensing elements of the set thereof,
wherein the first conductive region comprises a first set of conductive subregions, including a first conductive subregion and a second conductive subregion, and
wherein respective conductive subregions of the set thereof are mutually electrically isolated.

2. The corrosion sensor according to claim 1, wherein respective conductive regions of the set thereof are electrically isolated from respective sensing elements of the set thereof by gaps, having uniform and/or equal widths.

3. The corrosion sensor according to claim 1, wherein respective conductive subregions of the set thereof are mutually electrically isolated by spacings, having substantially uniform and/or equal widths.

4. The corrosion sensor according claim 1, wherein the patterned conductive layer defines:
a common track; and
a set of tracks, including a first track and a second track,
wherein respective sensing elements of the set thereof are electrically coupled to the common terminal via the common track, and
wherein respective sensing elements of the set thereof are electrically coupled to respective terminals of the set thereof via respective tracks of the set thereof.

5. The corrosion sensor according to claim 4, wherein the first track is bounded, at least in part, by the second track.

6. The corrosion sensor according to claim 1, wherein the respective terminals of the set thereof are mutually aligned, equispaced, and/or equisized.

7. The corrosion sensor according to claim 6, wherein the common terminal and the respective terminals of the set thereof are mutually aligned, equispaced, and/or equisized.

8. The corrosion sensor according to claim 1, wherein at least a portion of the patterned conductive layer is covered by a coating, the coating having a set of perforations, including a first perforation, therein and/or therethrough.

9. The corrosion sensor according to claim 1, further comprising an electronic component electrically coupled to the common terminal and/or to the respective terminals of the set thereof.

10. The corrosion sensor according to claim 1, wherein respective sensing elements of the set thereof have a thickness in a range from 50 nm to 150 nm.

11. A method of monitoring corrosion using a corrosion sensor, the method comprising: providing a corrosion sensor according to claim 1; and measuring respective resistances between the common terminal and respective terminals of the set thereof.

12. A corrosion sensing system, the system comprising:
at least two corrosion sensors, each corrosion sensor comprising:
a substrate; and
a patterned conductive layer provided on the substrate, wherein the patterned conductive layer defines: a common terminal; a set of terminals, including a first terminal and a second terminal; a set of sensing elements, including a first sensing element and a second sensing element; and a set of conductive regions, including a first conductive region, wherein respective sensing elements of the set thereof are electrically coupled to the common terminal and to respective terminals of the set thereof, such that the respective terminals of the set thereof are specific to the respective sensing elements of the set thereof, wherein respective conductive regions of the set thereof are disposed between and electrically isolated from respective sensing elements of the set thereof, wherein the first conductive region comprises a first set of conductive subregions, including a first conductive subregion and a second conductive subregion, and wherein respective conductive subregions of the set thereof are mutually electrically isolated.

13. A structure, the structure comprising:
a corrosion sensor comprising:
a substrate; and
a patterned conductive layer provided on the substrate, wherein the patterned conductive layer defines: a common terminal; a set of terminals, including a first terminal and a second terminal; a set of sensing elements, including a first sensing element and a second sensing element; and a set of conductive regions, including a first conductive region, wherein respective sensing elements of the set thereof are electrically coupled to the common terminal and to respective terminals of the set thereof, such that the respective terminals of the set thereof are specific to the respective sensing elements of the set thereof, wherein respective conductive regions of the set thereof are disposed between and electrically isolated from respective sensing elements of the set thereof, wherein the first conductive region comprises a first set of conductive subregions, including a first conductive subregion and a second conductive subregion, and wherein respective conductive subregions of the set thereof are mutually electrically isolated.

* * * * *